United States Patent [19]

Giannuzzi

[11] Patent Number: 5,449,257
[45] Date of Patent: * Sep. 12, 1995

[54] SELF DRILLING ANCHOR

[76] Inventor: Louis N. Giannuzzi, 59 Dingletown Rd., Greenwich, Conn. 06830

[*] Notice: The portion of the term of this patent subsequent to Aug. 13, 2008 has been disclaimed.

[21] Appl. No.: 43,379

[22] Filed: Apr. 5, 1993

Related U.S. Application Data

[60] Division of Ser. No. 707,661, May 30, 1991, Pat. No. 5,234,299, which is a continuation-in-part of Ser. No. 396,109, Aug. 21, 1989, Pat. No. 5,039,262, which is a continuation-in-part of Ser. No. 215,307, Jul. 5, 1988, Pat. No. 4,892,429, which is a continuation-in-part of Ser. No. 81,016, Aug. 3, 1987, Pat. No. 4,763,456.

[51] Int. Cl.$^6$ ............................................. F16B 25/10
[52] U.S. Cl. ................................... 411/31; 411/387; 411/395
[58] Field of Search ........................ 411/25, 29, 30, 31, 411/33, 44, 55, 57, 71, 178, 378, 386, 387, 397, 399, 424, 395, 184

[56] References Cited

U.S. PATENT DOCUMENTS

| | | | |
|---|---|---|---|
| 126,366 | 4/1872 | Wills | 411/395 |
| 1,138,219 | 5/1915 | Hottenroth | 411/57 |
| 1,175,665 | 3/1916 | Sweet | 411/399 |
| 2,026,686 | 1/1936 | Kirley | 411/57 |
| 3,178,991 | 4/1965 | Bisbing | 411/57 |
| 4,013,071 | 3/1977 | Rosenberg | 411/397 |
| 4,601,625 | 7/1986 | Ernst et al. | 411/387 |
| 4,642,012 | 2/1987 | Blucher et al. | 411/395 |
| 4,934,885 | 6/1990 | Woods et al. | 411/57 |
| 5,160,225 | 11/1992 | Chern | 411/178 |
| 5,308,203 | 5/1994 | McSherry et al. | 411/395 |

Primary Examiner—Michael Safavi
Attorney, Agent, or Firm—Michael Ebert

[57] ABSTRACT

A self-drilling anchor installable in a wall by means of a screwdriver, the anchor being adapted to receive a fastener serving to hold a fixture adjacent the wall. The anchor includes an externally-threaded shank section having a head engageable by the screwdriver and a longitudinal bore to receive the fastener. Integral with the shank section and extending axially therefrom is a core drill section whose bit includes at least one cutting blade and whose outer cylindrical surface acts as guide means whereby as the anchor is turned in to the wall by a screwdriver, the cutting blade then bores a round hole therein whose bank is engaged by the cylindrical surface to ensure circularity of the drilled hole. And as the anchor continues to turn, the shank section enters and taps the drilled hole until its head engages the outer surface of the wall to complete the anchor installation.

17 Claims, 2 Drawing Sheets

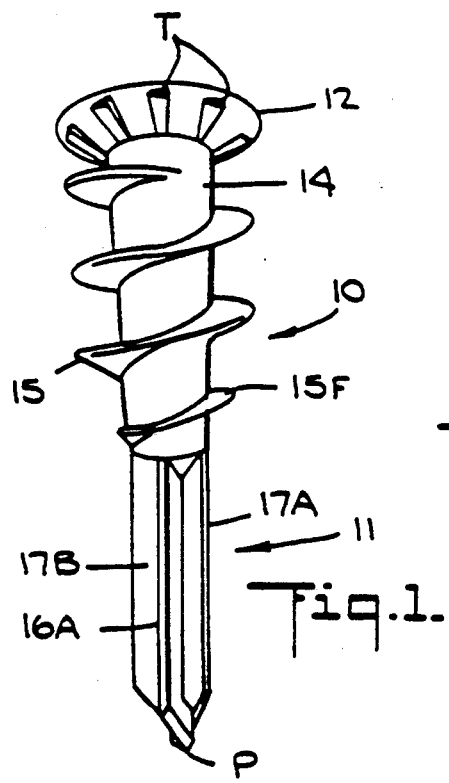
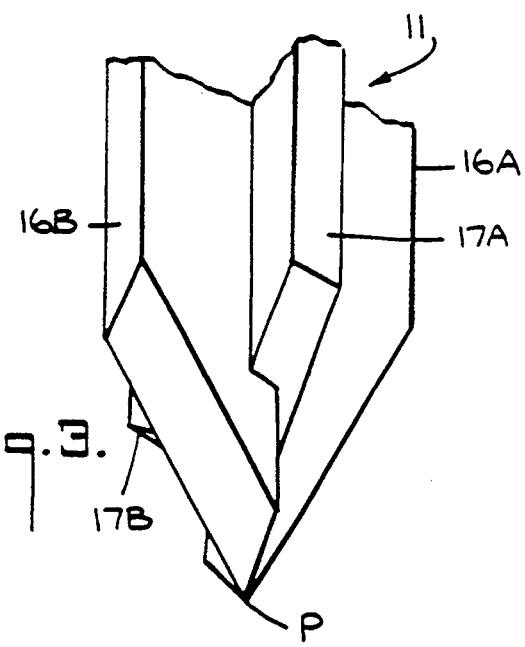
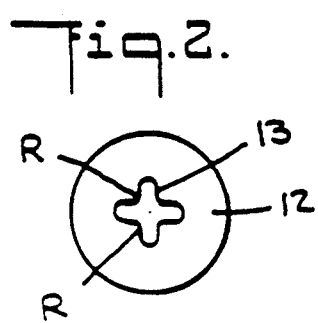
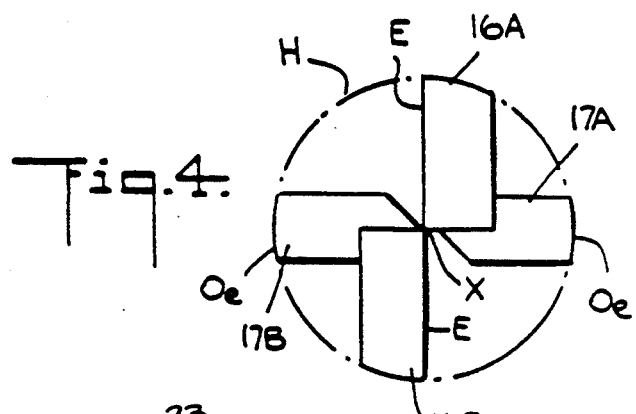
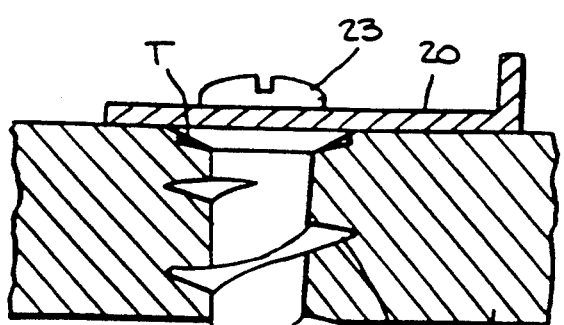
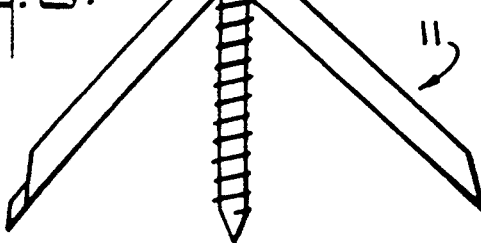

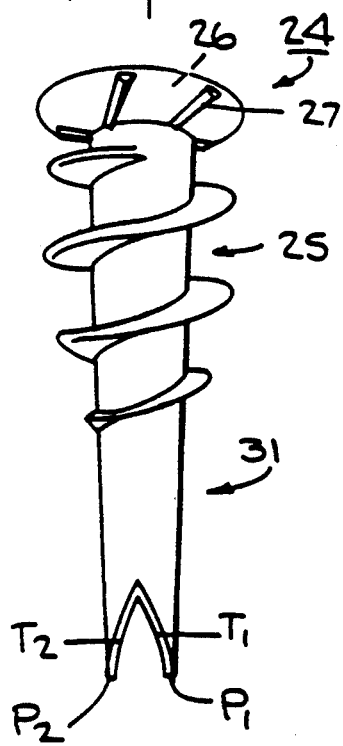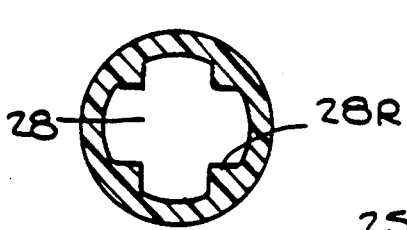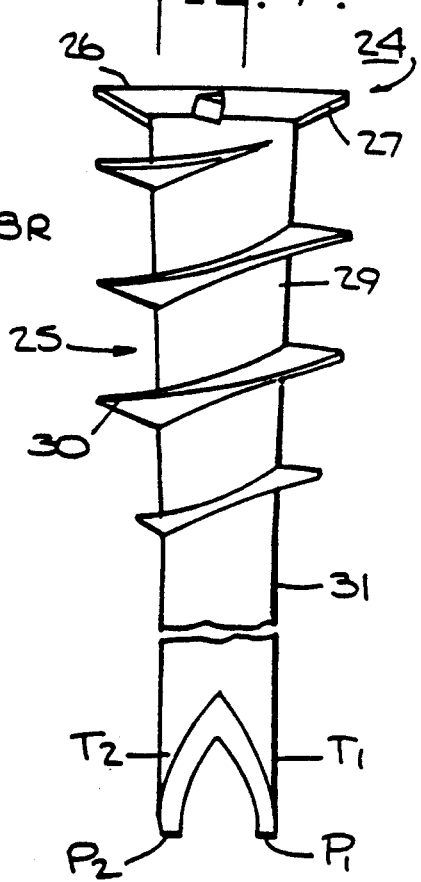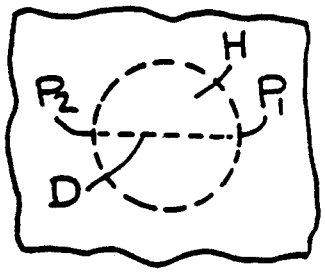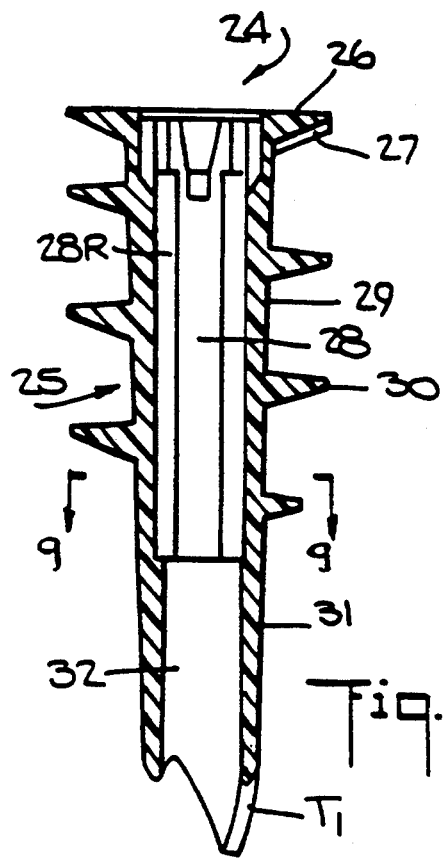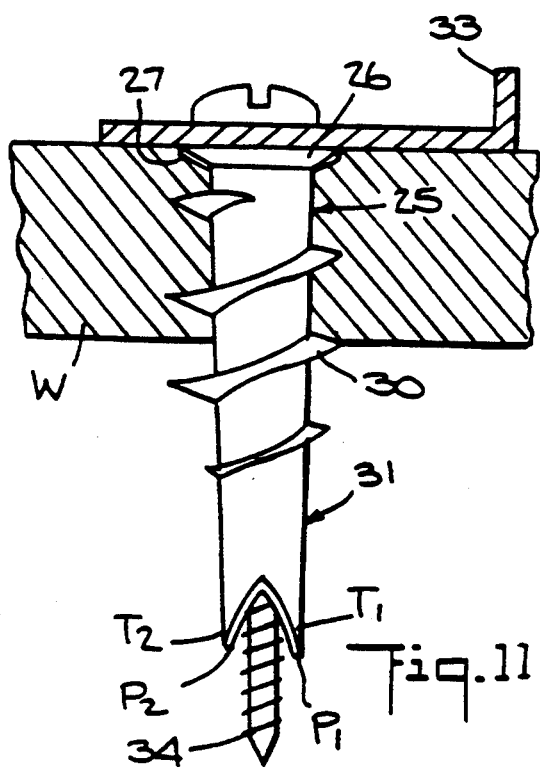

SELF DRILLING ANCHOR

RELATED APPLICATIONS

This application is a division of my application Ser. No. 707,661, filed May 30, 1991 (now U.S. Pat. No. 5,234,299), entitled "Improved Self-Drilling Wall Anchor" which is a continuation-in-part of application Ser. No. 396,109, filed Aug. 21, 1989 (now U.S. Pat. No. 5,039,262), entitled "Self-Drilling Wall Anchor," which is a continuation-in-part of my application Ser. No. 215,307, filed Jul. 5, 1988, entitled "Roof Anchor and Stress Plate Assembly," now U.S. Pat. No. 4,892,429, which in turn is a continuation-in-part of an application Ser. No. 081,016, filed Aug. 3, 1987 having the same title (now U.S. Pat. No. 4,763,456). The entire disclosures of these related cases are incorporated herein by reference.

BACKGROUND OF INVENTION

Field of Invention

This invention relates generally to an anchor which when installed in a hole drilled in a wall is adapted to receive a threaded fastener that serves to hold a fixture or other object against the wall, and more particularly to a self-drilling anchor of this type which dispenses with the need for any tool other than a screwdriver to install the anchor and which is usable with fasteners of different length.

Status of The Prior Art

In order to mount brackets, fixtures and other objects provided with mounting holes against the outer surface of a wall formed of plasterboard, sheetrock, fiberboard or any other material employed in hollow wall construction, the common practice is to use a hollow wall anchor for this purpose. The conventional hollow wall anchor formed of metal or plastic, when hammered into and wedged within a hole pre-drilled in the wall, is then adapted to receive a threaded fastener or mounting screw that goes through the mounting hole in the fixture and turns into the hollow of the anchor.

The required length of the mounting screw depends on the thickness of the fixture or object to be supported against the wall. Thus if the object is a thin metal bracket, a screw of smaller length is required than if the object is a thick plate or board, for this dictates a longer screw.

The installation of a conventional anchor entails three distinct operations, the first and most critical step being drilling a hole in the wall, for the diameter of this hole must be appropriate to that of the anchor. Should an oversize hole be drilled, then in the next step when the anchor is hammered into the hole, the anchor may will not wedge firmly therein but will be somewhat loose. As a consequence, it will be difficult to carry out the third step.

In the third step, one must turn a threaded fastener into the hollow of the anchor, and in doing so tap the anchor. But if the anchor is somewhat loose in the wall hole, this will cause the anchor to turn as the fastener is turned, and the fastener will therefore not be able to thread its way into the anchor.

There is also a possible fourth step that must be taken into account; for should a need arise to remove an object mounted on the wall or replace it with another object, then one must first unscrew the fastener from the anchor lodged in the wall. However, if when an unscrewing torque is applied to the fastener, this torque causes the anchor as well as the fastener to turn, then it will not be possible to withdraw the fastener from the anchor. The need therefore exists fro an anchor which, after being lodged in a hole drilled in the wall, will resist being turned counterclockwise and thereby make it possible to unscrew a threaded fastener from the installed anchor.

The installation of a conventional hollow anchor requires three tools: a drill provided with a drill bit having a diameter appropriate to that of the anchor; a hammer to drive the anchor in the hole drilled in the wall; and a screwdriver to turn the threaded fastener into the anchor or to later remove it from the anchor.

Though a typical householder or other non-professional possesses a hammer and a screwdriver, he may lack a drill. But even if he has a drill, he may not have a drill bit of the appropriate diameter for the anchor to be installed. Yet there are distinct advantages to be gained by using hollow wall anchors to mount objects against a wall, rather than screws, nails or other fasteners which require no drilling but which have relatively poor holding power, particularly in walls made of friable materials. Nevertheless, the need for drilling has to a significant degree heretofore discouraged the use of hollow anchors by non-professionals.

Though hollow wall anchors are used on a large scale by professional installers, the need to drill holes and then hammer the anchors into holes is a practical drawback, for these operations are time consuming and hence impose distinct limits on the number of anchors that can be installed in a given period. And if anchors of different sizes must be installed, then the installer must change the drill bit when switching from one anchor size to another, and this, too, consumes time and reduces the productivity of the installer.

To overcome these drawbacks, the 1986 patent to Ernst et al., U.S. Pat. No. 4,601,625, discloses an anchor for drywall that has an externally-threaded cylindrical section adapted to receive a fastener, and an unthreaded drilling section. This anchor is installable using only a hand-powered screwdriver for this purpose, thereby dispensing with the need for a drill and a hammer. At the upper end of the anchor is a low profile flange or head which allows the anchor to be installed flush with the drywall surface.

The Ernst et al. patent discloses an embodiment or an anchor molded of zinc, and another embodiment formed of plastic material. Both embodiments include a drill section that can be deflected laterally upon insertion of a mounting screw therethrough. This makes it possible to use a single mounting screw or fastener of moderate length in conjunction with the anchor for attaching objects of various thicknesses to the wall. It is also possible when the need arises to do so, to use longer fasteners.

In Ernst et al., the drill section is formed by a single flat blade whose free end is notched to define a central spike and a pair of peripheral spikes on either side of the central spike the function of the central spike, which extends beyond the peripheral spikes and therefore is the first to penetrate the surface of the drywall, is to maintain the location of the rotating drill section as a hole is drilled by the peripheral spikes. In practice, when a single blade is used to bore a hole in friable material such as drywall, the resultant drilled hole may not be perfectly round, for when this material encounters the central or guide spike, it tends to make the blade whip, as a consequence of which the drilling is shifted off center and the bored hole is oversize or elliptical.

In my U.S. Pat. No. 5,039,262 (Giannuzzi) entitled "Self-Drilling Wall Anchor" there is disclosed an anchor having an externally-threaded shank section that terminates in a drill section. In contradistinction to the cylindrical, externally-threaded section in Ernst et al., the shank section of my anchor has a root which tapers toward the drill section and a threading surrounding the root formed by a series of convolutions whose crests are of essentially the same diameter along substantially the full length of the shank section. The advantage of this arrangement is that as the anchor is screwed into a wall of friable material, the pulverized material is then packed by the threading into a relatively dense mass which surrounds the shank to enhance its resistance to withdrawal from the wall.

Another feature of the Giannuzzi anchor lacking in the Ernst et al. anchor is that the drill section is provided with guide means in the form of guide blades that as the cutting blades proceed to bore a hole in the wall, the guide blades maintain the circularity of the hole so that it is not elliptical or off-round; thereby ensuring proper thread formation and maximum holding strength when the shank section of the anchor taps the drilled hole.

In the Ernst et al. anchor, in order for a screw fastener or mounting screw which is longer than the anchor to secure an object to the wall in which the anchor is installed, it must be able to pass beyond the drill section. To the end, the Ernst et al. anchor is provided with a notch or other means in its drill section which when engaged by the tip of the advancing mounting screw, acts to deflect the drill section to permit passage of the mounting screw beyond the drill section. In the Giannuzzi anchor, the drill section is split open by the advancing mounting screw to permit its passage.

SUMMARY OF INVENTION

In view of the foregoing, the main object of this invention is to provide an improved self-drilling anchor which is installable in a wall by means of a screwdriver, the anchor being adapted to receive a fastener or mounting screw that serves to hold a fixture or other object against the wall, the anchor dispensing with the need for a drill, a hammer, or any tool other than a screwdriver to install the anchor.

More particularly, an object of this invention is to provide a self-drilling anchor having a drill section extending axially from an externally-threaded shank section, the drill section being in the form of a cylindrical core drill whose bore is aligned with the bore of the shank section whereby an elongated mounting screw can pass through the shank section and into and beyond the drill section.

Yet another object of this invention is to provide an anchor of the above type whose shank section has a tapered root having convoluted threading thereon, whereby as the anchor is turned into a wall of friable material, the resultant particles are then packed by the threading into a relatively dense mass which surrounds the shank to enhance its resistance to withdrawal from the wall.

Still another object of the invention is to provide a plastic anchor of the above type which is fabricated of high strength material and which can be manufactured at relatively low cost.

Briefly stated, these objects are attained in a self-drilling anchor installable in a wall by means of a screwdriver or similar tool, the anchor being adapted to receive a fastener that serves to hold a fixture or other object against the wall.

The anchor includes an externally-threaded shank section having a head engageable by the screwdriver and a longitudinal bore threadably to receive the fastener. Integral with the shank section and extending axially therefrom is a core drill section whose bit includes at least one cutting blade and whose outer cylindrical surface acts as guide means whereby as the anchor is turned in to the wall by a screwdriver, the cutting blade then bores a round hole therein whose bank is engaged by the cylindrical surface to ensure circularity of the drilled hole. And as the anchor continues to turn, the shank section enters and taps the drilled hole until its head engages the outer surface of the wall to complete the anchor installation.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a prior self-drilling anchor;

FIG. 2 is a top view of the anchor;

FIG. 3 is a magnified perspective view of the point portion of the drill section of the anchor;

FIG. 4 is a transverse section taken through the drill section of the anchor to show the relationship of the cutting blades to the guide blades;

FIG. 5 illustrates the prior anchor installed in a hollow wall, a threaded fastener being received in the anchor, the length of the fastener being such as to split open the drill section.

FIG. 6 is a perspective view of a self-drilling anchor having a core drill section in accordance with the invention;

FIG. 7 is an elevational view of the anchor;

FIG. 8 is a longitudinal section taken through the anchor;

FIG. 9 is a transverse section taken in the plane indicated by line 9—9 in FIG. 8;

FIG. 10 shows the points of the drill section in relation to the hole to be drilled; and FIG. 11 shows the anchor installed in a hollow wall, with a threaded fastener being received in the anchor whose length is such that it extends beyond the anchor.

DETAILED DESCRIPTION OF INVENTION

The Prior Anchor

Referring now to FIGS. 1 to 5, there is illustrated in these figures a prior self-drilling anchor molded of synthetic plastic material and having a hollow shank section 10 and a drill section 11 integral therewith.

An anchor in accordance with the invention is an improvement over the prior anchor disclosed in FIGS. 1 to 5. While it has a similar shank section, its drill section takes a different form and does not have to be deflected or split open in order for a fastener inserted in the anchor to pass beyond the drill section. Hence, FIGS. 1 to 5 provide a background to facilitate understanding of an anchor in accordance with the invention.

The synthetic plastic material from which the prior anchor is molded must be of high strength, and when formed to create a sharp edge, this edge must be capable of cutting the material of the hollow wall in which the anchor is installed. The wall is made of plasterboard, sheet rock, fiberboard and any other material used in hollow wall construction. This material is usually friable; that is to say, it is easily crumbled, and the anchor for this wall must take this into account.

Preferably, the prior anchor is molded of nylon reinforced with long glass fibers (about 30% by weight) to provide a composite which is ductile and therefore moldable at low cost. The fiberglass constituent of the composite affords the strength and rigidity required of the anchor and also effective cutting edges for the drill section. In practice, the composite material possesses a natural or neutral color that will blend with the surface color of the hollow wall.

Hollow shank section 10 is adapted to receive an externally-threaded fastener or mounting screw to hold a bracket, a fixture, a board of any other object having a mounting hole against the surface of the wall in which the anchor is installed. The length of the fastener is appropriate to the thickness of the object to be held.

Shank section 10 has at its upper end an enlarged head 12 or flange in a low-profile, truncated conical formation. When the anchor is installed in a hollow wall of plasterboard of other relatively soft material, head 12 will then sink into the wall and lie flush against its surface.

Formed on the underside of head 12 is a radial array of ratchet teeth T whose triangular geometry is such that when the anchor is turned clockwise into a wall and the teeth engage its surface, the teeth slip in this direction and do not impede turning, whereas should one thereafter seek to turn out the anchor, the teeth will bite into the wall to resist counterclockwise movement of the anchor. Because of this feature, should the occasion arise when one wishes to unscrew the threaded fastener from an anchor installed in a wall, this action will not at the same time cause the anchor to unscrew from the wall and thereby render it difficult if not impossible to remove the fastener from the anchor.

Because the flange or head 15 is formed of composite nylon material having some degree of flexure, the teeth T on the underside of the head will yield and not cut away the plasterboard or other wall material as the anchor is being screwed into its final position.

An advantage of an anchor whose head lies flush against the wall in which the anchor is installed, apart from the fact that this head does not slightly space the fixture or other object being mounted from the wall, is that if the fixture is later removed from the wall, and one wishes to erase the presence of the anchor, there is no need to remove the anchor. One has only to spackle over the head to provide a clean wall surface.

Shank section 10 has a longitudinal cavity 13 therein having a cruciform formation defining at 90° intervals ridges R extending the length of the shank section. Ridges R which surround the central zone of the cavity are capable of being tapped by the threading of a metal mounting screw or fastener. One may therefore employ in conjunction with the anchor mounting screws in a limited range of diameters rather than a screw having a predetermined diameter. And as will later be explained, the mounting screw may be much longer than the length of shank section 10, for the drill section yields to permit the screw to more or less extend beyond the shank section to accommodate fixtures or other objects of various thicknesses to be mounted against the wall.

The cruciform formation of the cavity creates a socket in head 15 of shank section 10 adapted to receive the blade of a Phillips-type screwdriver or of a conventional screwdriver which is either manually driven or motor powered.

Shank section 10 has a root 14 which is tapered, whereas the convolutions of the spiral threading 15 which surrounds the root have crests that are of essentially the same diameter for the full length of the section except for the final convolution 15F which is of reduced diameter to merge with drill section 11 and thereby avoid an abrupt transition from drill section 11 to shank section 10.

The relationship of the threading to the root is such as to cause material which is easily pulverized as the shank section is turned into the wall, to form a densified mass surrounding this section to resist withdrawal of the anchor from the wall.

Drill section 11 is provided with a pair of cutting blades 16A and 16B which, as best seen in FIG. 4, extend in opposite directions from the longitudinal axis X of the anchor so that the planar cutting edges E of these blades are diametrically opposed and act to cut a hole H in the wall when the anchor is turned. At right angles to the respective cutting blades is a pair of guide blades 17A and 17B which engage the bank of hole H to ensure circularity of the hole bored in the wall whereby axis X of the anchor is colinear with the center axis of the hole.

The outer ends $O_e$ of the guide blades are convex to conform to the curvature of the bank of the hole and to sweep the bank as the drill section is turned. In this way, a round hole is bored into the wall, thereby avoiding the tendency of a drill section having a single blade as in the Ernst et al. patent, to cut an oversize or elliptical hole.

The lower ends of the cutting and guide blades 16A, 16B and 17A, 17B are chamfered. The lower ends of the cutting blades which are somewhat longer than the guide blades define a triangular point P. Thus when the anchor is pressed into the surface of a wall, point P penetrates into the surface. When the anchor is then turned by a torque-producing tool, a hole is bored therein by the cutting blades as guided by the guide blades to ensure the formation of a round hole.

In practice, the self-drilling anchor shown in FIGS. 1 to 4, instead of being made of synthetic plastic material, may be fabricated of a corrosion-resistant metal such as zinc or brass.

Referring now to FIG. 5, there is shown a prior anchor installed in a hollow wall 18 whose thickness is less than the length of shank section 10 of the anchor, so that a portion of this section extends beyond the inner surface of the wall. It will be seen that low-profile head 15 of the anchor lies flush with the outer surface of the wall and that the teeth T on the undersurface of head 15 are embedded in the wall material to resist turning out of the anchor.

Received in the hollow of shank section 10 is a mounting screw 23 which holds a fixture 20 against the surface of the wall, fixture 20 having a mounting hole 21 to admit the screw. When mounting screw 23 which is longer than the under is turned into shank section 10, it forces its way beyond the well at the lower end of the cavity and in doing so splits open drill section 11 to permit the mounting screw to exit from the shank section and pass beyond the drill section.

Core Drill Anchor

Referring now to FIGS. 6 to 11, there is shown a reusable self-drilling anchor in accordance with the invention, generally designated by numeral 24, which may be molded of synthetic plastic material, such as Nylon, or of corrosion-resistant metal, such as zinc. The anchor section 25 having at its upper end an enlarged head 26 or flange in a low-profile, truncated conical formation. When the anchor is installed in a hollow wall of plasterboard or other relatively soft material, head 26 will then sink into the wall and lie flush against its outer surface.

Formed on the undersurface of head 26 is a radial array of teeth 27, preferably in a triangular ratchet formation, so that when the anchor is turned clockwise into the wall and the teeth then engage its surface, the teeth will slip in this direction and hence not impede turning. But should one thereafter seek to turn out the anchor, such counterclockwise motion will be resisted by the teeth.

Shank section 25 has a longitudinal bore 28 therein having a cruciform formation defining at 90° intervals ribs or ridges 28R extending the length of the shank section. Ridges 28R which surround the central zone of bore 28 are capable of being tapped by the threading of a metal mounting screw or fastener. One may therefore employ in conjunction with this anchor, mounting screws in a limited range of diameters rather than a screw having a predetermined diameter.

The cruciform formation of the bore creates a socket in head 26 of shank section 25 adapted to receive the blade of a Phillips-type screwdriver or that of a conventional screwdriver which is either manually driven or motor powered.

Shank section 25 has a root 29 which is tapered, whereas the convolutions of the spiral threading 30 which surround the root have crests that are of essentially the same diameter for the full length of the section except for the final convolutions, which are of reduced diameter.

As pointed out in connection with the prior anchor shown in FIGS. 1 to 5, the relationship of the threading to the root is such as to cause wall material which is easily pulverized as the shank section is turned into the wall, to form a densified mass surrounding this section to resist withdrawal of the anchor from the wall.

Integral with and extending axially from shank section 25 is a cylindrical core drill section 31 whose external diameter matches the external diameter of the tapered root 29 of the shank section at the lowermost end of this root. Hence the root of the shank section flows into the drill section without any discontinuity therebetween. The longitudinal bore 32 of the drill section is aligned with the longitudinal bore 28 of the shank section.

The diameter of bore 32 is such as to accommodate any mounting screw or threaded fastener capable of tapping the bore 28 of the shank section. As pointed out above, one does not have to employ with this anchor a fastener of predetermined diameter, for it is usable with fasteners in a limited range of diameters, as long as the diameter of the fastener is such that it can pass through the bore without causing the anchor to expand, rupture or deflect.

A conventional core drill is a drill that removes a cylindrical core from the drill hole, the core drill having a bit that functions as the cutting element of the drill.

In the core drill section 31 in accordance with the invention, the bit therefor is constituted by a pair of diametrically-opposed cutting teeth $T_1$ and $T_2$. Each tooth is defined by a curved wall having a triangular form. The tip of the triangle functions as a cutting edge.

Hence when, as shown in FIG. 10, the anchor is pressed into a typical wall of relatively soft material, the points $P_1$ and $P_2$ of the core drill section penetrate the wall, the points being at the poles of the diameter D of the hole H to be drilled. This diameter is equal to the diameter of the cylindrical core drill section.

The cylindrical exterior surface of the core drill section acts as guide means to ensure the circularity of the drilled hole, for as the screwdriver turns the core drill section into the wall material, the bit teeth $T_1$ and $T_2$ proceed to cut a round hole whose form is defined by the cylindrical exterior surface.

After the drill section has drilled a hole in the wall W, as the anchor continues to be turned by the screwdriver, the shank section of the anchor then enters this hole, and the threading of this section taps the drilled hole, until, as shown in FIG. 11, the head of the shank section engages the surface of the wall.

The length of the self-drilling anchor is determined by the thickness of the hollow wall for which it is intended; for when the anchor is being installed, its drill section 31, for most materials, should project from the rear of the wall before the threads of the shank section engage and tap the drilled hole. In FIG. 11, the length of the shank section 25 is longer than the thickness of the wall; hence a lower portion of the shank section sticks out of the wall.

To hold a fixture 33 against the outer surface of wall W, a threaded fastener 34 is inserted through the mounting hole in the fixture into the bore of the shank section and is screwed therein, the fastener tapping its way into the bore. The length of fastener 34 is greater than that of the anchor; hence as it turns and advances, it goes through the bore of the shank section and then through the bore of the cylindrical core drill section, the screw then emerging from the drill section, as shown in FIG. 11.

In this self-drilling anchor, other than the core of pulverized wall material disposed withih the bore of the core drill section, there is nothing to impede passage of the fastener, and as the fastener advances beyond the shank section, it ejects the core of pulverized material from the drill section, which is neither deflected nor split to permit such passage. Hence the integrity of the anchor is maintained, and should it be later desirable to unscrew the anchor from the wall, this can be done without difficulty, thereby making it possible to again use the anchor.

Because in the core drill anchor the bore of the core drill section communicates with the bore of the shank section, a screw fastener or mounting screw inserted in the anchor is free to advance through and beyond the anchor, and there is no need to deflect the drill section or split it open as in prior anchors.

A core drill anchor in accordance with the invention is installable not only in hollow walls but in any material that can be drilled and tapped, such as aerated concrete, wood or low density masonry.

A conventional drill when drilling a hole in the wall acts to excavate the material which defines the hole, so that the entire hole is vacant. In contradistinction, a core drill acts to cut an annular passage in the wall which surrounds a cylindrical core of the wall material, the exterior diameter of the passage being usually equal to that of the core drill cylinder and its thickness being equal to the thickness of the cutting bit.

Because much less material is excavated by a core drill when drilling an annular passage in the material than is excavated by a conventional drill of the same size, it can drill much faster than a conventional drill. This is a significant advantage when a large number of anchors are to be installed. While with the core drill section, a plug of wall material is enclosed within the core drill cylinder, this plug is pushed out when a screw fastener is inserted in the anchor.

While there have been shown and described a preferred embodiment of an improved self-drilling anchor in accordance with the invention, it will be appreciated that many changes and modifications may be made therein without, however, departing from the essential spirit thereof. Thus instead of the bit of the core drill section being formed by a pair of opposed teeth, the bit may be formed by a circular array of teeth.

I claim:

1. A self-drilling anchor installable in a wall by means of a torque-producing tool and adapted, when installed, to receive and engage a fastener to hold an object adjacent the wall, said anchor comprising:
   (a) an externally-threaded shank section adapted to receive the tool for turning the anchor into a wall in which the anchor is to be installed, the shank section having a longitudinal bore for receiving and engaging a fastener to hold said object adjacent said wall; and
   (b) a core drill section integral with the shank section and extending axially therefrom for drilling a circular hole in a wall in which the anchor is to be installed which is tapped by the shank section to secure the anchor to the wall, the core drill section having a longitudinal bore generally aligned with the bore of the shank section and an open end to permit said fastener to advance beyond the shank section and pass into said core drill section.

2. An anchor as set forth in claim 1, in which the drill section includes a bit defined by at least one cutting tooth.

3. An anchor as set forth in claim 1, in which the drill section has an arcuate exterior surface which acts as a guide to ensure the circularity of the hole drilled thereby.

4. An anchor as set forth in claim 1, in which the core drill section is formed by a hollow cylinder whose exterior surface acts as a guide to ensure the circularity of the hole drilled thereby.

5. An anchor as set forth in claim 2, in which the drill section is provided with a bit defined by a pair of opposed cutting teeth.

6. An anchor as set forth in claim 5, in which the teeth each have a triangular configuration whose tips define cutting edges.

7. An anchor as set forth in claim 1, in which the shank has a head in a truncated form whose undersurface is provided with an array of teeth, which, when engaged with the wall in which the anchor is installed, act to resist turning out of the anchor.

8. An anchor as set forth in claim 1, in which the longitudinal bore in the shank section has a cruciform cross section to define ridges which are tapped by a screw-type fastener.

9. An anchor as set forth in claim 4, in which the shank section has a tapered root which is integral with the cylinder of the drill section whose diameter is substantially equal to that of the root at its junction with the cylinder.

10. An anchor as set forth in claim 1, molded of synthetic, plastic material of high strength.

11. An anchor as set forth in claim 10, in which the material is nylon.

12. A self-drilling one-piece anchor installable in a wall by means of torque-producing tool and adapted, after being installed in the wall, to receive and engage a fastener to hold an object adjacent the wall, said anchor comprising:
   (a) an externally-threaded shank section adapted to receive the tool for turning the anchor into a wall in which the anchor is to be installed, the shank having a longitudinal bore for receiving and engaging said fastener to hold said object; and
   (b) a core drill section integral with the shank section and extending therefrom for drilling an annular opening in the wall in which the anchor is to be installed surrounding a removable core of wall material to define a hole which is tapped by the shank section to secure the anchor to the wall, the core drill section having a longitudinal passage therein generally aligned with the bore of the shank section to permit said fastener to advance beyond said shank into and out of said passage.

13. A self-drilling, one-piece anchor installable in a wall by means of torque-producing tool and adapted, after being installed in the wall, to receive and engage a fastener to hold an object adjacent the wall, said anchor comprising:
   (a) an externally-threaded shank section adapted to receive the tool for turning the anchor into a wall in which the anchor is to be installed, the shank having a longitudinal bore for receiving and engaging said fastener to hold said object; and
   (b) at least two cutting teeth in spaced relation integral with the shank section and extending therefrom to drill a hole in the wall which is tapped by the shank section to secure an anchor to the wall in which the anchor is to be installed, and a longitudinal passage extending axially between the teeth and generally aligned with the bore of the shank section to permit said fastener to advance beyond the shank section into and out of said passage.

14. A self-drilling, one-piece anchor installable in a wall by means of a torque-producing tool in combination with a fastener, said anchor being adapted, after being installed in the wall, to receive and engage said fastener to hold an object adjacent the wall, said anchor comprising:
   (a) an externally-threaded shank section adapted to receive the tool for turning the anchor into a wall in which the anchor is to be installed, the shank having a longitudinal bore for receiving and engaging said fastener to hold said object adjacent said wall; and
   (b) drill means extending from the shank section for drilling a hole in the wall in which the anchor is to be installed which is tapped by the shank section to secure the anchor to the wall, said drill means having a passage therein having a leading portion provided with an opening communicating with the bore of the shank section to permit said fastener to advance beyond said shank section into and out of said passage.

15. A self-drilling anchor as set forth in claim 14 in which the combined length of the bore in the shank section and the bore in the drill means is shorter than the length of the fastener whereby after the anchor is installed in the wall, the fastener received in the anchor passes out of the passage in the drill means and is not intercepted by the drill means.

16. The combination of a self-drilling anchor installable in a hollow wall by means of a torque-producing tool and a threaded fastener received in the anchor and engaged thereby to hold an object adjacent the wall, said anchor comprising:

(a) an externally-threaded shank section adapted to receive the tool for turning the anchor into a wall in which the anchor is to be installed, the shank section having a longitudinal bore receiving the threaded fastener and tapped thereby to engage the fastener holding said object; and (b) drilling means integral with the shank section and extending therefrom for drilling a hole of uniform diameter in the wall in which the anchor is to be installed which is tapped by the shank section to secure the anchor to the wall, said drilling means having a passage therein having a leading portion provided with an opening communicating with the bore in said shank section to permit said fastener received in the shank section to advance therebeyond into said passage.

17. A self-drilling anchor and fastener as set forth in claim 16, in which said fastener is longer than said anchor and when received therein, the fastener advances into said passage then projects beyond the drilling means.

* * * * *